United States Patent
Resmini et al.

(10) Patent No.: US 8,299,152 B2
(45) Date of Patent: Oct. 30, 2012

(54) TIRE FOR VEHICLE WHEELS COMPRISING CROSSLINKED ELASTOMERIC COMPOSITION

(75) Inventors: Emiliano Resmini, Milan (IT); Luigia Rossiello, Milan (IT); Diego Tirelli, Milan (IT); Franco Peruzzotti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 510 days.

(21) Appl. No.: 12/312,076

(22) PCT Filed: Oct. 30, 2006

(86) PCT No.: PCT/EP2006/010402
§ 371 (c)(1),
(2), (4) Date: Apr. 24, 2009

(87) PCT Pub. No.: WO2008/052571
PCT Pub. Date: May 8, 2008

(65) Prior Publication Data
US 2009/0272475 A1   Nov. 5, 2009

(51) Int. Cl.
*C08K 5/16* (2006.01)
*B60C 5/00* (2006.01)

(52) U.S. Cl. ........................................ 524/186; 152/450

(58) Field of Classification Search .................... 524/186
See application file for complete search history.

(56) References Cited

U.S. PATENT DOCUMENTS

| | | |
|---|---|---|
| 4,426,459 A | 1/1984 | Watabe et al. |
| 4,550,142 A | 10/1985 | Akita et al. |
| 4,742,124 A | 5/1988 | Tsutsumi et al. |
| 4,768,937 A | 9/1988 | Singh |
| 4,872,822 A | 10/1989 | Pizzorno |
| 5,516,952 A * | 5/1996 | Lee et al. .................... 585/241 |
| 5,844,043 A | 12/1998 | Peter et al. |
| 6,265,454 B1 | 7/2001 | McNutt et al. |
| 6,407,180 B1 | 6/2002 | Wideman et al. |
| 6,479,558 B1 * | 11/2002 | Fliermans .................... 521/41 |
| 7,541,460 B2 * | 6/2009 | Chan et al. .................. 544/276 |
| 2006/0293398 A1 | 12/2006 | Christofi et al. |
| 2007/0185239 A1 * | 8/2007 | Tirelli et al. ............... 523/205 |

FOREIGN PATENT DOCUMENTS

| | | |
|---|---|---|
| EP | 0 199 064 B1 | 10/1986 |
| EP | 0 451 604 B1 | 10/1991 |
| EP | 0 928 680 B1 | 7/1999 |
| EP | 0 928 702 B1 | 7/1999 |
| EP | 1 031 440 A2 | 8/2000 |
| WO | WO 88/02313 | 4/1988 |
| WO | WO 2004/076492 A2 | 9/2004 |
| WO | WO 2005/058615 A1 | 6/2005 |
| WO | WO 2006/012912 A1 | 2/2006 |
| WO | WO 2006012912 A1 * | 2/2006 |

* cited by examiner

*Primary Examiner* — Hui Chin

(74) *Attorney, Agent, or Firm* — Finnegan, Henderson, Farabow, Garrett & Dunner, L.L.P.

(57) ABSTRACT

A tire for vehicle wheels, includes at least one structural element obtained by crosslinking a crosslinkable elastomeric composition including at least one vulcanized rubber in a subdivided form surface treated with at least one oxidizing agent; at least one diene elastomeric polymer, and at least one sulfur-based vulcanizing agent. A surface treatment process of vulcanized rubber and crosslinkable elastomeric composition is obtained with the vulcanized rubber in a subdivided form surface treated with at least one oxidizing agent.

44 Claims, 1 Drawing Sheet

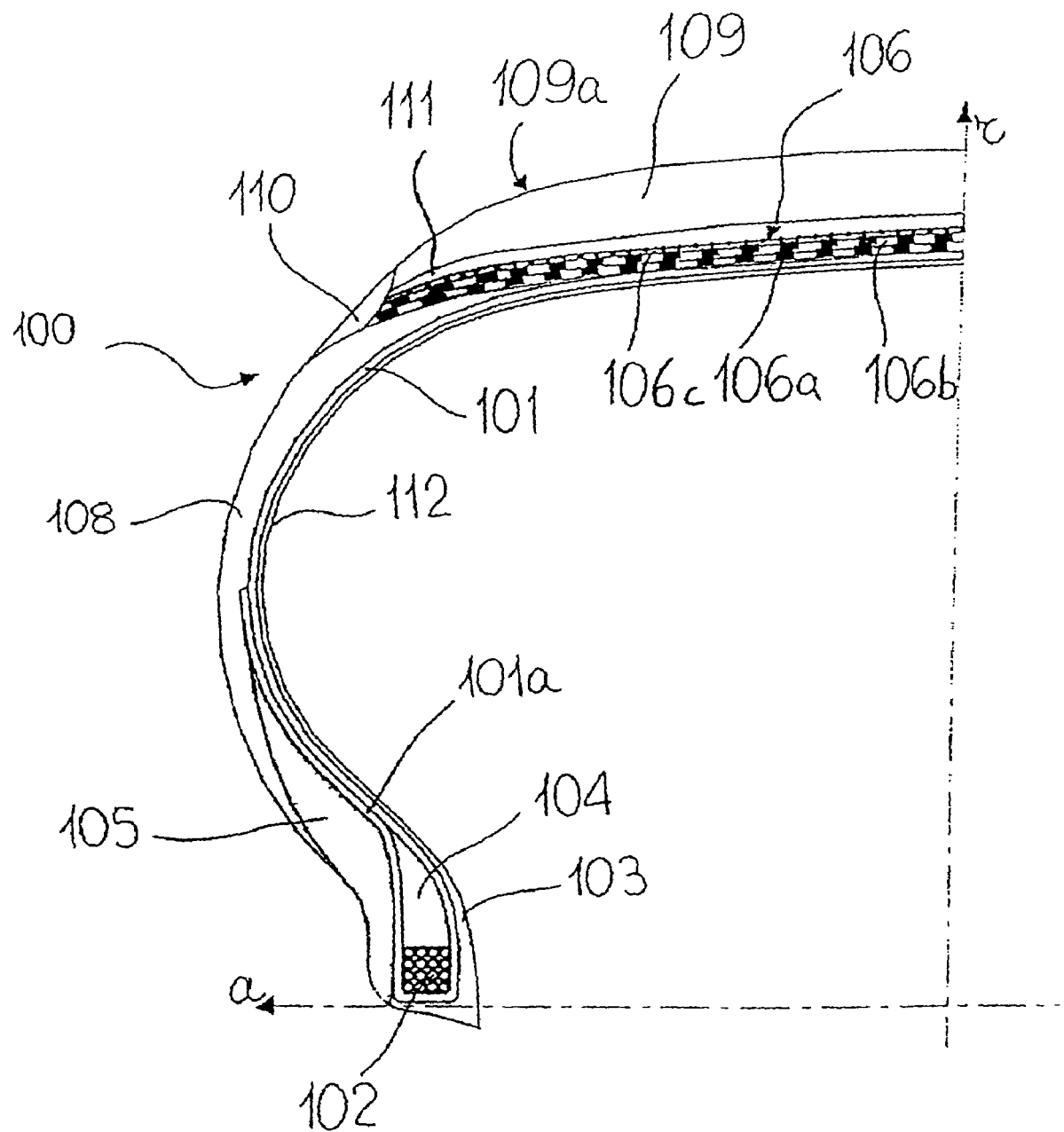

US 8,299,152 B2

TIRE FOR VEHICLE WHEELS COMPRISING CROSSLINKED ELASTOMERIC COMPOSITION

CROSS REFERENCE TO RELATED APPLICATION

This application is a national phase application based on PCT/EP2006/010402, filed Oct. 30, 2006, the content of which is incorporated herein by reference.

FIELD OF THE INVENTION

The present invention relates to a tire for vehicle wheels.

More in particular, the present invention relates to a tire for vehicle wheels comprising at least one structural element obtained by crosslinking a crosslinkable elastomeric composition comprising at least one vulcanized rubber in a subdivided form as defined above.

Moreover, the present invention relates to a crosslinkable elastomeric composition, as defined above.

In a further aspect, the present invention also relates to a process for manufacturing said crosslinkable elastomeric composition.

BACKGROUND OF THE ART

The increased production of industrial rubber products has resulted in the accumulation of large amounts of rubber wastes which are generally disposed in dedicated landfills with the main drawbacks of environment pollution as well as of the need for large dedicated areas for storing said wastes.

It is known in the art to depolymerize waste rubber, such as tires, in an effort to reduce the volume of waste and obtain a useful byproduct. Likewise, rubber product may be devulcanized in an attempt to recycle the waste rubber.

In addition to these techniques, it is common in the art to grind the waste rubber and utilize the ground particles so obtained. These ground particles are then typically compounded with other polymeric materials in order to make final products which may be employed in a plurality of applications.

It is already known in the art to use said ground particles as an ingredient of crosslinkable elastomeric compositions. However, the crosslinked article obtained from said elastomeric compositions generally show a significant deterioration of their mechanical properties.

Many efforts have been made in the art in order to improve the mechanical properties of the above disclosed articles.

For example, International Patent Application WO 88/02313 relates to a vehicle tire having a tread portion which comprises the molded and cured product of a rubber molding composition containing from about 20% by weight to about 80% by weight, preferably from about 35% by weight to about 75% by weight, of a treated particulate rubber material comprising cured rubber particles which have been surface-treated with a liquid, sulfur-curable polymeric binder having ethylenic unsaturation and which is soluble in benzene, hexane or both, the binder softening the cured rubber particle surfaces to which it is applied. Homopolymers and copolymers of 1,4-butadiene and substituted butadienes are preferred as the liquid polymeric binder. Said treated particulate rubber material is blended with a virgin stock rubber. The above mentioned tread is said to have a wear resistance which is at least as good as and often better than the wear resistance of a tread made from virgin rubber molding stock. However, the hardness, tensile strength and elongation of the above mentioned tread were adversely affected by the addition of said treated particulate rubber material.

International Patent Application WO 2005/058615 relates to crosslinkable elastomeric compositions capable of being used advantageously in the production of crosslinked manufactured products, in particular in the production of tires, by using a vulcanized rubber in a subdivided form which has been surface treated with a silane coupling agent. In this way, it is said to be possible to obtain crosslinked manufactured products having improved mechanical properties, in particular stress at break and tensile modulus, with respect to those of crosslinked manufactured products obtained from compositions in which the vulcanized rubber is used as such (i.e. not surface-treated vulcanized rubber).

U.S. Pat. No. 5,844,043 relates to a free-flowing granular crosslinkable composition made of recycled rubber granules, rubber and oil. More in particular, said crosslinkable composition consists essentially of 100 part by weight of vulcanized rubber granules intimately mixed and coated with 3-35 parts by weight of a solution of unvulcanized polyoctenamer dissolved in oil, at a temperature below the decomposition temperature of the unvulcanized polyoctenamer, and an effective amount of a vulcanizing agent. The above mentioned crosslinkable composition is said to be easily press-molded into molded bodies having good mechanical and elastic properties. Said crosslinkable composition is said to be useful, for example, for the manufacturing of floor coverings and extrudates.

European Patent Application EP 1,031,440 relates to a pneumatic tire having a rubber sidewall composition comprising: (a) from 5 to 50 parts by weight of a recycled rubber which has an individual particle size no greater than 420 mm; (b) from 0.1 to 5 parts by weight per 100 parts by weight of recycled rubber of 3,3'-tetrathiodipronic acid; and (c) 100 parts by weight of at least one additional rubber selected from the group consisting of at least one of natural and/or synthetic cis-1,4-polyisoprene rubber, cis-1,4-polybutadiene rubber, styrene/butadiene copolymer rubber, styrene/isoprene/butadiene terpolymer rubber, ethylene/propylene/diene copolymer (EPDM) rubber, acrylonitrile/butadiene copolymer rubber and 3,4-polyisoprene rubber. The above mentioned composition is said to have good mechanical properties.

U.S. Pat. No. 6,265,454 relates to a tire component rubber formulation, said formulation comprising rubber and additives and having blended therein up to about 50 parts by weight of recycled cured ground tire rubber particles based upon 100 total parts by weight of said tire component rubber formulation and said recycled cured ground rubber particles, wherein said recycled cured ground tire rubber particles replace a partial amount of said tire component rubber formulation, and wherein said recycled cured ground tire rubber particles have a size of 90 U.S. Standard Mesh or smaller. The ground particles generally replace equivalent amounts of rubber and additives (such as carbon black and oil). The above mentioned tire component is said to maintain good physical properties.

U.S. Pat. No. 6,407,180 relates to a process for preparing a sulfur vulcanized rubber composition comprising: (A) homogeneously blending a pre-formed composite of carbon black and tris(2-aminoethyl) amine, with a particulate, sulfur pre-vulcanized rubber (e.g. recycled cured rubber) to form a treated vulcanized rubber composition thereof; (B) mixing about 40 parts by weight of said treated pre-vulcanized rubber composition with 100 parts by weight of at least one unvulcanized rubber to form a rubber composition blend comprising said unvulcanized rubber and said treated pre-vulcanized rubber; (C) heating said rubber composition blend for a time sufficient and at a suitable temperature to vulcanize the unvulcanized rubber composition contained therein. The invention also relates to articles of manufacture, including tires, which have at least one component comprising said rubber composition. The above mentioned rubber composition is said to have accelerated cure rates at lower than conventional temperatures.

SUMMARY OF THE INVENTION

The Applicant has faced the problem of providing a crosslinkable elastomeric composition especially useful for producing structural elements of tyres which comprises significative amounts of at least one vulcanized rubber in a subdivided form obtained, e.g., by grinding vulcanized rubber articles, e.g., wasted tyres, without jeopardizing the properties of the resulting article, particularly in terms of mechanical properties and abrasion resistance.

The Applicant has now found that it is possible to obtain crosslinkable elastomeric compositions capable of being used advantageously in the production of crosslinked manufactured products, in particular in the production of tires, by using a vulcanized rubber in a subdivided form which has been surface treated with an oxidizing agent.

More in particular, the Applicant has observed that said crosslinked manufactured products show good mechanical properties, in particular stress at break and elongation at break.

Moreover, the Applicant has also observed that said crosslinked manufactured products show an improved abrasion resistance.

According to a first aspect, the present invention relates to a tire for vehicle wheels, comprising at least one structural element obtained by crosslinking a crosslinkable elastomeric composition comprising:
at least one vulcanized rubber in a subdivided form surface treated with at least one oxidizing agent;
at least one diene elastomeric polymer;
at least one sulfur-based vulcanizing agent.

According to one preferred embodiment, the present invention relates to a tire for vehicle wheels, comprising:
a carcass structure shaped in a substantially toroidal configuration, the opposite lateral edges of which are associated with respective right-hand and left-hand bead wires to form respective beads;
a belt structure applied in a radially external position with respect to said carcass structure;
a tread band radially superimposed on said belt structure;
a pair of sidewalls applied laterally on opposite sides with respect to said carcass structure;
wherein said structural element obtained by crosslinking a crosslinkable elastomeric composition comprising:
at least one vulcanized rubber in a subdivided form surface treated with at least one oxidizing agent;
at least one diene elastomeric polymer;
at least one sulfur-based vulcanizing agent; is the tread band.

According to a second aspect, the present invention relates to a crosslinkable elastomeric composition comprising:
at least one vulcanized rubber in a subdivided form surface treated with at least one oxidizing agent;
at least one diene elastomeric polymer;
at least one sulfur-based vulcanizing agent.

According to a further aspect, said invention relates to a process for producing a crosslinkable elastomeric composition comprising the following steps:

(a) surface treating at least one vulcanized rubber in a subdivided form with at least one oxidizing agent;
(b) mixing the surface treated vulcanized rubber in a subdivided form obtained in step (a) with at least one diene elastomeric polymer and at least one sulfur-based vulcanizing agent.

The step (a) of surface treating a vulcanized rubber in a subdivided form with at least one oxidizing agent, may be carried out by dispersing said vulcanized rubber in a subdivided form and said at least one oxidizing agent in a mixture comprising a solvent.

Preferably, the addition and mixture to the surface treated vulcanized rubber in a subdivided form of said at least one diene elastomeric polymer and said at least one sulfur-based vulcanizing agent is made separately. More preferably, step (b) comprises the steps of (b1) mixing the surface treated vulcanized rubber in a subdivided form obtained in step (a) with at least one diene elastomeric polymer, and (b2) mixing the elastomeric composition obtained in step (b1) with at least one sulfur-based vulcanizing agent.

The oxidizing agent can be an inorganic or organic oxidizing agent.

Preferably, the inorganic oxidizing agent may be selected, for example, from: potassium permanganate, hydrogen peroxide, osmium tetraoxide, hydrogen peroxide/urea complex, sodium percarbonate, sodium perchlorate, sodium perborate, potassium peroxymonosulfate, potassium permanganate/potassium periodate aqueous solution, or mixtures thereof. Sodium percarbonate is particularly preferred.

Suitable organic oxidizing agents for the process of the present invention can be selected from a wide variety of such materials known to those skilled in the synthetic arts. These oxidizing agents include substituted and unsubstituted quinones and quinone derivatives such as quinone imines and quinone diimines, hypervalent iodine compounds, nitroarenes, triarylaminium salts, oxonium salts, peroxides and nitrosium salts. The organic oxidizing agent are preferably selected from the group of peroxides. Preferably, the organic oxidizing agent may be selected, for example, from: lauroyl peroxide, benzoyl peroxide, 2,4-dichlorobenzoyl peroxide, m-toluoyl peroxide, peroxyacetic acid, 2,5-oxanoyl peroxide, succinic peroxide, diisopropylbenzene hydroperoxide, paramethane hydroperoxide, pinane hydroperoxide, cumene hydroperoxide, p-menthane hydroperoxide, tert-butyl peroxyacetate, tert-butyl peroxypivalate, tert-butyl peroxyneodecanoate, tert-butyl peroxyoctanoate, methyl ethyl ketone peroxide, acetone peroxide, acetylacetone peroxide, cyclohexanone peroxide, methylcyclohexanone peroxide, m-chloroperoxybenzoic acid, di-t-butyl peroxide, t-butylcumyl peroxide, t-butyl hydroperoxide, 2,5-dimethylhexane-2,5-dihydroperoxide, 2,5-dimethyl-2,5-di(t-butylperoxy)hexane, 1,1-bis(t-butyl-peroxy)cyclohexane, 2,2-bis(tert-butylperoxy)-butane, 2,5-dimethyl-2,5-dibenzoylperoxy-hexane, 1,3-bis(t-butyl-peroxyisopropyl)-benzene, 3,3,5-trimethyl-cyclohexanone peroxide, 1,1-bis(t-butyl-peroxy)-3,3,5-trimethylcyclo-hexane, dicumyl peroxide, and dimethylstyryl peroxy-dicarbonate.

Preferably, the oxidizing agent is used in an amount of from 1% by weight to 50% by weight, preferably of from 10% by weight to 25% by weight, with respect to the total weight of the vulcanized rubber in a subdivided form.

The solvent can be water or an organic solvent. Water and mixtures of water with water soluble organic solvents are the preferred solvents when using inorganic oxidizing agent. Organic solvents are preferably employed when using organic oxidizing agent. Preferably, the organic solvent may be selected, for example, from: ketones such as acetone;

alcohols such as ethanol, methanol; ethers such as tetrahydrofurane, dioxane; or mixtures thereof.

Preferably, the organic solvent is used in an amount of from 0.1% by weight to 10% by weight, preferably of from 1% by weight to 5% by weight, with respect to the total weight of the vulcanized rubber in a subdivided form.

Preferably, step (a) is carried out at a temperature of from 20° C. to 150° C., more preferably from 50° C. to 100° C.

Preferably step (a) is carried out for a time of from 5 min to 60 min, more preferably from 10 min to 30 min.

Preferably, said vulcanized rubber in a subdivided form is heated at a temperature of from 20° C. to 150° C., more preferably from 50° C. to 100° C., before the addition of the oxidizing agent.

Preferably, the surface treatment of the vulcanized rubber in a subdivided form may be carried out in a mixing device known in the art such as, for example, a ribbon blender or a turbo-mixer.

Preferably, a surface active agent is added when the solvent comprises water or mixture thereof with water soluble organic solvent(s). The surface active agent may be selected from non-ionic or ionic surfactants.

Examples of non-ionic surfactants include non-ionic fluorinated surfactants and non-ionic hydrocarbon surfactants.

Useful examples of non-ionic hydrocarbon surfactants include ethers, such as polyoxyethylene nonyl phenyl ether, polyoxyethylene octyl phenyl ether, polyoxyethylene dodecyl phenyl ether, polyoxyethylene alkyl allyl ethers, polyoxyethylene oleyl ether, polyoxyethylene lauryl ether, polyoxyethylene alkyl ethers, polyoxyalkylene alkyl ethers; esters, such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and glycol surfactants. Specific examples of nonionic surfactants include octylphenoxy polyethoxy ethanols, such as Triton™ X-100, X-114, and X-405, available from Union Carbide Co., Danbury, Conn.; acetylenic diols such as 2,4,7,9-tetramethyl-5-decyn-4,7-diol and the like, such as Surfynol™ GA and Surfynol™ CT-136, available from Air Products & Chemicals Co., Allentown, Pa., trimethyl nonylpolyethylene-glycol ethers, such as Tergitol™ TMN-10 (containing 10 oxyethylene units, believed to be of the formula $C_{12}H_{25}O(C_2HO)_5H$) available from Union Carbide Co., Danbury, Conn.; polyols such as Polyol PP50, Polyol PP30, Polyol PP150, Polyol PP50S, and Polyol PS85 pentaerythritol derivatives, available from Perstorp Chemicals Gmbh., Arnsberg, Germany, non-ionic esters of ethylene oxide, such as Merpol™ SH (believed to be of the formula $CH_3(CH_2)_{12}(OC_2H_6)_8OH$), available from E. I. Du Pont de Nemours & Co., Wilmington, Del.; non-ionic esters of ethylene oxide and propylene oxide, such as Merpol™ LFH (believed to be of the formula $CH_3(CH_2)_n (OC_2H_4)_3 (OC_3H_6)_8OH$, where n is an integer from about 12 to about 16), available from E. I. Du Pont de Nemours & Co., Wilmington, Del., and the like, as well as mixtures thereof.

Non-limiting examples of non-ionic fluorinated surfactants include linear perfluorinated polyethoxylated alcohols (e.g., Zonyl™ FSN, Zonyyl™ FSN-100, Zonyl™ FSO, and Zonyl™ FSO-100 available from DuPont Specialty Chemicals, Wilmington, Del.), fluorinated alkyl polyoxyethylene ethanols (e.g., Fluorad™ FC-170C available from 3M, St. Paul, Minn.), fluorinated alkyl alkoxylate (e.g., Fluorad™ FC-171 available from 3M, St. Paul, Minn.), fluorinated alkyl esters (e.g., Fluorad™ FC-430, FC431, and FC-740 available from 3M, St. Paul, Minn.) and fluorine-substituted alkyl esters and perfluoroalkyl carboxylates (for example, F-tergent series manufactured by Neos Co., Ltd., Lodyne series manufactured by Ciba-Geigy, Monflor series manufactured by ICI, Surfluon series manufactured by Asahi Glass Co., Ltd., and Unidyne series manufactured by Daikin Industries, Ltd.).

Preferred examples of the anionic surfactants include alkylsulfocarboxylates, olefin sulfonates, polyoxyethylene alkyl ether acetates, N-acyl amino acid and salts thereof, N-acyl methyltaurine salts, alkylsulfate, polyoxy alkyl ether sulfates, polyoxyethylene alkyl ether phosphates, rosin soap, castor oil sulfate, lauryl alcohol sulfate, alkylphenol phosphates, alkyl phosphates, alkyl allyl sulfonates, diethylsulfosuccinate, diethylhexylsulfosuccinate, and dioctylsulfosuccinate.

Useful examples of the cationic surfactants include 2-vinylpyridine derivatives and poly vinylpyridine derivatives.

Non limiting examples of the amphoteric surfactants include lauryl dimethyl aminoacetic acid betaine, 2-alkyl-N-carboxymethyl-N-hydroxyethyl imidazolinium betaine, propyldimethylaminoacetic acid betaine, polyoctyl polyaminoethyl glycine, and imidazoline derivatives.

Preferably, the surface active agent is used in an amount of from 0.1% by weight to 10% by weight, preferably of from 1% by weight to 5% by weight, with respect to the total weight of the vulcanized rubber in a subdivided form.

Preferably, step (b) is carried out at a temperature of from 0° C. to 250° C., more preferably from 50° C. to 160° C.

Preferably, step (b) is carried out for a time of from 1 min to 30 min, more preferably from 4 min to 20 min.

As already mentioned before, step (b) preferably comprises two separate steps for the addition and mixing of the at least one diene elastomeric polymer and at least one sulfur-based vulcanizing agent, respectively. More preferably, step (b) comprises the steps of (b1) mixing the surface treated vulcanized rubber in a subdivided form obtained in step (a) with at least one diene elastomeric polymer, and (b2) mixing the elastomeric composition obtained in step (b1) with at least one sulfur-based vulcanizing agent.

More preferably, step (b1) is carried out at a temperature of from 0° C. to 250° C., more preferably from 50° C. to 160° C.

More preferably, step (b1) is carried out for a time of from 1 min to 30 min, more preferably from 4 min to 20 min.

More preferably, step (b2) is carried out at a temperature of from 0° C. to 120° C., more preferably from 60° C. to 100° C.

More preferably, step (b2) is carried out for a time of from 1 min to 30 min, more preferably from 4 min to 20 min.

The vulcanized rubber in a subdivided form which may be used in the present invention may be obtained by grinding or otherwise comminuting any source of vulcanized rubber compound such as, for example, tires, roofing membranes, hoses, gaskets, and the like, and is preferably obtained from reclaimed tires using any conventional method. For example, the vulcanized rubber in a subdivided form may be obtained by mechanical grinding at ambient temperature or in the presence of a cryogenic coolant (i.e. liquid nitrogen). Any steel or other metallic inclusions should be removed from the ground tires before use. Since the material of the present invention is preferably fiber-free, all fibrous material such as, for example, tire cord fibers, is preferably removed from the ground rubber using conventional separation methods.

According to one preferred embodiment, the vulcanized rubber in a subdivided form which may be used in the present invention, is in the form of powder or granules having a particle size not higher than 10 mm, preferably not higher than 5 mm.

According to a more preferred embodiment, the vulcanized rubber in a subdivided form which may be used in the present invention, has a particle size not higher than 1 mm, preferably not higher than 0.5 mm.

According to one preferred embodiment, the vulcanized rubber in a subdivided form is present in the crosslinkable elastomeric composition of the present invention in an amount of from 0.1 phr to 90 phr, preferably from 2 phr to 30 phr.

For the purposes of the present description and of the claims, the term "phr" means the parts by weight of a given component of the crosslinkable elastomeric composition per 100 parts by weight of the diene elastomeric polymer.

According to one preferred embodiment, the vulcanized rubber in a subdivided form which may be used in the present invention, may comprises at least one crosslinked diene elastomeric polymer or copolymer which may be selected from those commonly used in sulfur-crosslinkable elastomeric compositions, that are particularly suitable for producing tires, that is to say from elastomeric polymers or copolymers with an unsaturated chain having a glass transition temperature (Tg) generally below 20° C., preferably in the range of from 0° C. to –110° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

The conjugated diolefins generally contain from 4 to 12, preferably from 4 to 8 carbon atoms, and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2 phenyl-1,3-butadiene, or mixtures thereof.

Monovinylarenes which may optionally be used as comonomers generally contain from 8 to 20, preferably from 8 to 12 carbon atoms, and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4 phenylbutyl)styrene, or mixtures thereof.

Polar comonomers which may optionally be used may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile, or mixtures thereof.

Preferably, the crosslinked diene elastomeric polymer or copolymer may be selected, for example, from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, the vulcanized rubber in a subdivided form may comprise at least one crosslinked elastomeric polymer of one or more monoolefins with an olefinic comonomer or derivatives thereof. The monoolefins may be selected from: ethylene and α-olefins generally containing from 3 to 12 carbon atoms, such as, for example, propylene, 1-butene, 1-pentene, 1-hexene, 1-octene, or mixtures thereof. The following are preferred: copolymers between ethylene and an α-olefin, optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

According to one preferred embodiment, the diene elastomeric polymer which may be used in the present invention may be selected from those commonly used in sulfur-crosslinkable elastomeric compositions, that are particularly suitable for producing tires, that is to say from elastomeric polymers or copolymers with an unsaturated chain having a glass transition temperature (Tg) generally below 20° C., preferably in the range of from 0° C. to –110° C., which have been already disclosed above.

Preferably, the diene elastomeric polymer or copolymer may be selected, for example, from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The crosslinkable elastomeric composition according to the present invention may optionally comprises at least one elastomeric polymer of one or more monoolefins with an olefinic comonomer or derivatives thereof, which have been already disclosed above. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

A diene elastomeric polymer or copolymer or an elastomeric polymer selected from those above disclosed which has been functionalized by reaction with at least one suitable terminating agent or coupling agent may also be used. In particular, the diene elastomeric polymers or copolymers obtained by anionic polymerization in the presence of an organometallic initiator (in particular an organolithium initiator) may be functionalized by reacting the residual organometallic groups derived from the initiator with at least one suitable terminating agent or coupling agent selected, for example, from: imines, carbodiimides, alkyltin halides, substituted benzophenones, alkoxysilanes or aryloxysilanes (see, for example, European Patent EP 451,604, or U.S. Pat. No. 4,742,124 and U.S. Pat. No. 4,550,142).

According to one preferred embodiment, the sulfur-based vulcanizing agent may be selected from sulfur or derivatives thereof such as, for example:

soluble sulfur (crystalline sulfur);

insoluble sulfur (polymeric sulfur);

sulfur dispersed in oil (for example a dispersion of 33% sulfur in oil known under the trade name Crystex® OT33 from Flexsys);

sulfur donors such as, for example, tetramethyl-thiuram disulfide (TMTD), tetrabenzylthiuram disulfide (TBzTD), tetraethylthiuram disulfide (TETD); tetra-butylthiuram disulfide (TBTD), dimethyldiphenyl-thiuram disulfide (MPTD), pentamethylenethiuram tetra-sulfide or hexasulfide (DPTT), morpholinobenzothiazole disulfide (MBSS), N-oxydiethylenedithiocarbamyl-N'-oxydiethylenesulphenamide (OTOS), dithiodimorpholine (DTM or DTDM), caprolactam disulfide (CLD).

Said sulfur-based vulcanizing agent is present in the crosslinkable elastomeric composition of the present invention in an amount generally of from 0.5 phr to 5 phr, preferably from 1 phr to 3 phr.

At least one reinforcing filler may be advantageously added to the crosslinkable elastomeric composition of the present invention, in an amount generally of from 0.1 phr to 120 phr, preferably from 20 phr to 90 phr. The reinforcing filler may be selected from those commonly used for crosslinked manufactured products, in particular for tires, such as, for example, carbon black, silica, alumina, aluminosilicates, calcium carbonate, kaolin, or mixtures thereof.

The types of carbon black which may be used in the present invention may be selected from those conventionally used in the production of tires, generally having a surface area of not less than 20 $m^2/g$ (determined by CTAB absorption as described in Standard ISO 6810:1995).

The silica which may be used in the present invention may be, generally, a pyrogenic silica or, preferably, a precipitated silica, with a BET surface area (measured according to Standard ISO standard 5794-1:1994) of from 50 $m^2/g$ to 500 $m^2/g$, preferably from 70 $m^2/g$ to 200 $m^2/g$.

The use of vulcanized rubber in a subdivided form surface treated with at least one oxidizing agent has been found particularly effective when using crosslinkable elastomeric composition comprising silica. While the Applicant does not wish to be bound by any theory, and the invention should not be limited by such theory, it is believed that the presence of polar groups deriving from the oxidating treatment allows a better dispersion in a crosslinkable elastomeric composition comprising silica.

The crosslinkable elastomeric composition of the present invention may be vulcanized according to known techniques. To this end, in the composition, after a first stage of thermal-mechanical processing, a sulfur-based vulcanizing agent is incorporated together with vulcanization accelerators and activators. In this second processing stage, the temperature is generally kept below 120° C. and preferably below 100° C., so as to avoid any unwanted pre-crosslinking phenomena.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, and also BiO, PbO, $Pb_3O_4$, $PbO_2$, or mixtures thereof.

Accelerators that are commonly used may be selected from: dithiocarbamates, guanidine, thiourea, thiazoles, sulfenamides, thiurams, amines, xanthates, or mixtures thereof.

The crosslinkable elastomeric composition according to the present invention may comprise other commonly used additives selected on the basis of the specific application for which the composition is intended. For example, the following may be added to said composition: antioxidants, anti-aging agents, plasticizers, adhesives, anti-ozone agents, modifying resins, fibers (for example Kevlar® pulp), or mixtures thereof.

In particular, for the purpose of further improving the processability, a plasticizer generally selected from mineral oils, vegetable oils, synthetic oils, or mixtures thereof, such as, for example, aromatic oil, naphthenic oil, phthalates, soybean oil, or mixtures thereof, may be added to the crosslinkable elastomeric composition according to the present invention.

The amount of plasticizer generally ranges from 2 phr to 100 phr, preferably from 5 phr to 50 phr.

The crosslinkable elastomeric composition according to the present invention may be prepared by mixing together the polymeric components, the surface treated vulcanized rubber in a subdivided form and the sulfur-based vulcanizing agent, with the reinforcing filler optionally present and with the other additives according to techniques known in the art. The mixing may be carried out, for example, using an open mixer of open-mill type, or an internal mixer of the type with tangential rotors (Banbury) or with interlocking rotors (Intermix), or in continuous mixers of Ko-Kneader type (Buss) or of co-rotating or counter-rotating twin-screw type.

BRIEF DESCRIPTION OF THE DRAWING

The present invention will now be illustrated in further detail by means of an illustrative embodiment, with reference to the attached FIG. 1, which is a view in cross section of a portion of a tire made according to the invention.

"a" indicates an axial direction and "r" indicates a radial direction. For simplicity, FIG. 1 shows only a portion of the tire, the remaining portion not represented being identical and symmetrically arranged with respect to the radial direction "r".

The tire (100) comprises at least one carcass ply (101), the opposite lateral edges of which are associated with respective bead wires (102). The association between the carcass ply (101) and the bead wires (102) is achieved here by folding back the opposite lateral edges of the carcass ply (101) around the bead wires (102) so as to form the so-called carcass back-folds (101a) as shown in FIG. 1.

Alternatively, the conventional bead wires (102) can be replaced with a pair of annular inserts formed from elongate components arranged in concentric coils (not represented in FIG. 1) (see, for example, European Patent Applications EP 928,680 and EP 928,702). In this case, the carcass ply (101) is not back-folded around said annular inserts, the coupling being provided by a second carcass ply (not represented in FIG. 1) applied externally over the first.

The carcass ply (101) generally consists of a plurality of reinforcing cords arranged parallel to each other and at least partially coated with a layer of elastomeric compound. These reinforcing cords are usually made of textile fibers, for example rayon, nylon or polyethylene terephthalate, or of steel wires stranded together, coated with a metal alloy (for example copper/zinc, zinc/manganese, zinc/molybdenum/cobalt alloys, and the like).

The carcass ply (101) is usually of radial type, i.e. it incorporates reinforcing cords arranged in a substantially perpendicular direction relative to a circumferential direction. Each bead wire (102) is enclosed in a bead (103), defined along an inner circumferential edge of the tire (100), with which the tire engages on a rim (not represented in FIG. 1) forming part of a vehicle wheel. The space defined by each carcass back-fold (101a) contains a bead filler (104) wherein the bead wires (102) are embedded. An antiabrasive strip (105) is usually placed in an axially external position relative to the carcass back-fold (101a).

A belt structure (106) is applied along the circumference of the carcass ply (101). In the particular embodiment in FIG. 1, the belt structure (106) comprises two belt strips (106a, 106b) which incorporate a plurality of reinforcing cords, typically metal cords, which are parallel to each other in each strip and intersecting with respect to the adjacent strip, oriented so as to form a predetermined angle relative to a circumferential direction. On the radially outermost belt strip (106b) may optionally be applied at least one zero-degree reinforcing layer (106c), commonly known as a "0° belt", which generally incorporates a plurality of reinforcing cords, typically textile cords, arranged at an angle of a few degrees relative to a circumferential direction, and coated and welded together by means of an elastomeric material.

A side wall (108) is also applied externally onto the carcass ply (101), this side wall extending, in an axially external position, from the bead (103) to the end of the belt structure (106).

A tread band (109), whose lateral edges are connected to the side walls (108), is applied circumferentially in a position radially external to the belt structure (106). Externally, the tread band (109), which may comprise the crosslinkable composition according to the present invention, has a rolling surface (109a) designed to come into contact with the ground. Circumferential grooves which are connected by transverse notches (not represented in FIG. 1) so as to define a plurality of blocks of various shapes and sizes distributed over the rolling surface (109a) are generally made in this surface (109a), which is represented for simplicity in FIG. 1 as being smooth.

A strip made of elastomeric material (110), commonly known as a "mini-side wall", may optionally be present in the connecting zone between the side walls (108) and the tread band (109), this mini-side wall generally being obtained by co-extrusion with the tread band and allowing an improvement in the mechanical interaction between the tread band (109) and the side walls (108). Alternatively, the end portion of the side wall (108) directly covers the lateral edge of the tread band (109).

A layer of elastomeric material (111) which serves as an "attachment sheet", i.e. a sheet capable of providing the connection between the tread band (109) and the belt structure (106), may be placed between the tread band (109) and the belt structure (106).

In the case of tubeless tires, a rubber layer (112) generally known as a "liner", which provides the necessary impermeability to the inflation air of the tire, may also be provided in a radially internal position relative to the carcass ply (101).

The process for producing the tire according to the present invention may be carried out according to techniques and using apparatus that are known in the art, as described, for example, in European Patent EP 199,064 and in U.S. Pat. No. 4,872,822, U.S. Pat. No. 4,768,937, said process including at least one stage of manufacturing the green tire and at least one stage of vulcanizing this tire. Alternative processes for producing a tire or parts of a tire without using semi-finished products are disclosed, for example, in the above mentioned Patent Applications EP 928,680 and EP 928,702.

Although the present invention has been illustrated specifically in relation to a tire, other crosslinked elastomeric manufactured products that may be produced according to the invention may be, for example, belts such as, conveyor belts, power belts or driving belts; flooring and footpaths which may be used for recreational area, for industrial area, for sport or safety surfaces; flooring tiles; mats such as, anti-static computer mats, automotive floor mats; mounting pads; shock absorbers sheetings; sound barriers; membrane protections; shoe soles; carpet underlay; automotive bumpers; wheel arch liner; seals such as, automotive door or window seals; o-rings; gaskets; watering systems; pipes or hoses materials; flower pots; building blocks; roofing materials; geomembranes; and the like.

The present invention will be further illustrated below by means of a number of preparation examples, which are given for purely indicative purposes and without any limitation of this invention.

EXAMPLE 1

Surface Treatment of the Vulcanized Rubber in a Subdivided Form

Mechanically ground waste rubber was treated according to the following procedure. Table 1 discloses the amount of the various component in parts by weight with respect to 100 parts by weight of ground waste rubber as such.

TABLE 1

| EXAMPLE | 1 |
|---|---|
| Vulcanized rubber | 100 |
| Oxidizing agent | 12.65 |
| Surfactant | 1.98 |
| Water | 12.65 |

Vulcanized rubber: mechanically ground waste rubber from scrap tires (<0.425 mm (40 mesh) - from Somir);
Oxidizing agent: Oxyper™ S131, sodium percarbonate from Solvay;
Surfactant: Polyol™PP50, from Perstorp Polyols.

The mechanically ground waste rubber was charged into a laboratory turbo-mixer (BF srl Engineering) and was maintained under stirring. As soon as the temperature reached 80° C., the oxidizing agent and the surfactant were added and the obtained mixture was stirred for 10 min. After that, the amount of water was added and the obtained mixture was stirred again for additional 10 min. The obtained compound was cooled at 35° C. and was discharged.

EXAMPLE 2

Preparation of the Crosslinkable Elastomeric Compositions

The crosslinkable elastomeric compositions given in Table 2 were prepared as follows (the amounts of the various components are given in phr).

All the ingredients, except for the sulfur and the accelerators, were mixed together in an internal mixer (model Pomini PL 1.6) for about 5 min (1st Step). As soon as the temperature reached 145±5° C., the elastomeric composition was discharged. The sulfur and the accelerators were then added and mixing was carried out in an open roll mixer (2nd Step).

TABLE 2

| EXAMPLE | 2 (c) | 3 (c) | 4 (i) |
|---|---|---|---|
| 1ˢᵗ STEP | | | |
| NR | 8 | 8 | 8 |
| BR | 20 | 20 | 20 |
| SBR | 72 | 72 | 72 |
| Silica | 63 | 63 | 63 |
| Stearic acid | 2 | 2 | 2 |
| Antioxidants | 3.0 | 3.0 | 3.0 |
| Zinc oxide | 2.5 | 2.5 | 2.5 |
| Polyplastol ® 6 | 2 | 2 | 2 |

TABLE 2-continued

| EXAMPLE | 2 (c) | 3 (c) | 4 (i) |
|---|---|---|---|
| Vulcanized rubber[(1)] | — | 20 | — |
| Vulcanized rubber[(2)] 2nd STEP | — | — | 20 |
| CBS | 2.0 | 2.0 | 2.0 |
| Sulfur | 1.2 | 1.2 | 1.2 |

(c) comparison (i) invention
NR: natural rubber;
BR: cis-1,4-polybutadiene (Europrene ® BR 40 - EniChem Elastomeri);
SBR: styrene-butadiene rubber (Buna VLS 5025-1 HM - Bayer AG)
Silica: precipitated silica (Zeosil ® 1165 MP - Rhone-Poulenc);
Polyplastol ® 6: mixture of zinc salts of fatty acids (palmitic acid, stearic acid and oleic acid being present in major amount) (Great Lakes Chemical Corp.);
Vulcanized rubber[(1)]: mechanically ground waste rubber from scrap tires (<0.425 mm (40 mesh) - Somir);
Vulcanized rubber[(2)]: surface treated ground waste rubber obtained in Example 1;
CBS (accelerator): N-cyclohexyl-2-benzothiazyl-sulphenamide (Vulkacit ® CZ - Bayer);

The static mechanical properties were measured on samples of the above mentioned elastomeric compositions vulcanized at 170° C. for 10 min, according to Standard ISO 37:1994. The obtained results are given in Table 3.

The DIN abrasion values were measured according to Standard DIN 53516, also reported in Table 3, expressed as the amount of compound removed.

TABLE 3

| EXAMPLE MECHANICAL PROPERTIES | 2 | 3 | 4 |
|---|---|---|---|
| Stress at break (MPa) | 16.3 | 13.9 | 15.6 |
| Elongation at break (%) | 455 | 457 | 443 |
| DIN abrasion (mm$^3$) | 133.9 | 131.8 | 98.7 |

The invention claimed is:

1. A tire for vehicle wheels, comprising at least one structural element obtained by crosslinking a crosslinkable elastomeric composition comprising:
    at least one vulcanized rubber in a subdivided form surface treated with at least one oxidizing agent selected from inorganic or organic oxidizing agents;
    at least one diene elastomeric polymer; and
    at least one sulfur-based vulcanizing agent; and
    wherein the organic oxidizing agents are selected from substituted and unsubstituted quinones and quinone derivatives, quinone imines and quinone diimines, hypervalent iodine compounds, nitroarenes, triarylaminium salts, oxonium salts, peroxides and nitrosium salts.

2. The tire for vehicle wheels according to claim 1, comprising:
    a carcass structure shaped in a substantially toroidal configuration, the opposite lateral edges of which are associated with respective right-hand and left-hand bead wires to form respective beads;
    a belt structure applied in a radially external position with respect to said carcass structure;
    a tread band radially superimposed on said belt structure and comprising said structural element obtained by crosslinking a crosslinkable elastomeric composition comprising:
        at least one vulcanized rubber in a subdivided form surface treated with at least one oxidizing agent;
        at least one diene elastomeric polymer; and
        at least one sulfur-based vulcanizing agent; and
    a pair of sidewalls applied laterally on opposite sides with respect to said carcass structure.

3. The tire for vehicle wheels according to claim 1, wherein said inorganic oxidizing agent is selected from potassium permanganate, hydrogen peroxide, osmium tetraoxide, hydrogen peroxide/urea complex, sodium percarbonate, sodium perchlorate, sodium perborate, potassium peroxymonosulfate, potassium permanganate/potassium periodate aqueous solution, and mixtures thereof.

4. The tire for vehicle wheels according to claim 1, wherein said inorganic oxidizing agent is sodium percarbonate.

5. The tire for vehicle wheels according to claim 1, wherein said peroxide organic oxidizing agent is selected from lauroyl peroxide, benzoyl peroxide, 2,4-dichlorobenzoyl peroxide, m-toluoyl peroxide, peroxyacetic acid, 2,5-oxanoyl peroxide, succinic peroxide, diisopropylbenzene hydroperoxide, paramethane hydroperoxide, pinane hydroperoxide, cumene hydroperoxide, p-menthane hydroperoxide, tert-butyl peroxyacetate, tert-butyl peroxypivalate, tert-butyl peroxyneodecanoate, tert-butyl peroxyoctanoate, methyl ethyl ketone peroxide, acetone peroxide, acetylacetone peroxide, cyclohexanone peroxide, methylcyclohexanone peroxide, m-chloroperoxybenzoic acid, di-t-butyl peroxide, t-butylcumyl peroxide, t-butyl hydroperoxide, 2,5-dimethylhexane-2,5-dihydroperoxide, 2,5-dimethyl-2,5-di(t-butylperoxy)hexane, 1,1-bis(t-butyl-peroxy)cyclohexane, 2,2-bis(tert-butylperoxy)-butane, 2,5-dimethyl-2,5-dibenzoylperoxy-hexane, 1,3-bis(t-butyl-peroxyisopropyl)-benzene, 3,3,5-trimethyl-cyclohexanone peroxide, 1,1-bis(t-butyl-peroxy)-3,3,5-trimethylcyclohexane, dicumyl peroxide, and dimethylstyryl peroxydicarbonate.

6. The tire for vehicle wheels according to claim 1, wherein the vulcanized rubber in a subdivided form is surface treated with 1% by weight to 50% by weight of at least one oxidizing agent selected from inorganic or organic oxidizing agents, with respect to the total weight of the vulcanized rubber in a subdivided form.

7. The tire for vehicle wheels according to claim 6, wherein the vulcanized rubber in a subdivided form is surface treated with 10% by weight to 25% by weight of at least one oxidizing agent, with respect to the total weight of the vulcanized rubber in a subdivided form.

8. The tire for vehicle wheels according to claim 1, wherein the vulcanized rubber in a subdivided form has a particle size not higher than 10 mm.

9. The tire for vehicle wheels according to claim 1, wherein said vulcanized rubber in a subdivided form has a particle size not higher than 1 mm.

10. The tire for vehicle wheels according to claim 9, wherein said vulcanized rubber in a subdivided form has a particle size not higher than 0.5 mm.

11. The tire for vehicle wheels according to claim 1, comprising 0.1 phr to 90 phr of said vulcanized rubber in a subdivided form.

12. The tire for vehicle wheels according to claim 11, comprising 2 phr to 30 phr of said vulcanized rubber in a subdivided form.

13. The tire for vehicle wheels according to claim 1, wherein said vulcanized rubber in a subdivided form comprises at least one crosslinked diene elastomeric polymer or copolymer selected from: cis-1,4-polyisoprene, 3,4-polyisoprene, polybutadiene, halogenated or non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

14. The tire for vehicle wheels according to claim 1, wherein said vulcanized rubber in a subdivided form comprises at least one crosslinked elastomeric polymer of one or more monoolefins with an olefinic comonomer or derivatives thereof.

15. The tire for vehicle wheels according to claim 14, wherein said crosslinked elastomeric polymer is selected from: ethylene/propylene copolymers or ethylene/propylene/diene copolymers; polyisobutene; butyl rubbers; halobutyl rubbers, chlorobutyl rubbers, bromobutyl rubbers; or mixtures thereof.

16. The tire for vehicle wheels according to claim 1, wherein said diene elastomeric polymer is selected from: cis-1,4-polyisoprene, 3,4-polyisoprene, polybutadiene, halogenated or non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

17. The tire for vehicle wheels according to claim 1, wherein said elastomeric composition comprises at least one elastomeric polymer of one or more monoolefins with an olefinic comonomer or derivatives thereof.

18. The tire for vehicle wheels according to claim 17, wherein said elastomeric polymer is selected from ethylene/propylene copolymers or ethylene/propylene/diene copolymers; polyisobutene; butyl rubbers; halobutyl rubbers; or mixtures thereof.

19. The tire for vehicle wheels according to claim 1, wherein the sulfur-based vulcanizing agent is selected from:
    soluble sulfur, crystalline sulfur;
    insoluble sulfur, polymeric sulfur;
    sulfur dispersed in oil; and
    sulfur donors, tetramethylthiuram disulfide, tetrabenzylthiuram disulfide, tetraethylthiuram disulfide; tetrabutylthiuram disulfide, dimethyldiphenylthiuram disulfide, pentamethylenethiuram tetrasulfide, pentamethylenethiuram hexasulfide, morpholinobenzothiazole disulfide, N-oxydiethylenedithiocarbamyl-N'-oxydiethylene-sulphenamide, dithiodimorpholine; caprolactam disulfide.

20. The tire for vehicle wheels according to claim 19, comprising 0.5 phr to 5 phr of said sulfur-based vulcanizing agent.

21. The tire for vehicle wheels according to claim 1, comprising 0.1 phr to 120 phr of at least one reinforcing filler.

22. The tire for vehicle wheels according to claim 21, wherein the reinforcing filler is carbon black.

23. The tire for vehicle wheels according to claim 21, wherein the reinforcing filler is silica.

24. A process for producing a crosslinkable elastomeric composition comprising the following steps:
    (a) surface treating at least one vulcanized rubber in a subdivided form with at least one oxidizing agent selected from inorganic or organic oxidizing agents and
    (b) mixing the surface treated vulcanized rubber in a subdivided form obtained in step (a) with at least one diene elastomeric polymer and at least one sulfur-based vulcanizing agent; and wherein the organic oxidizing agents are selected from substituted and unsubstituted quinones and quinone derivatives, quinone imines and quinone diimines, hypervalent iodine compounds, nitroarenes, triarylaminium salts, oxonium salts, peroxides and nitrosium salts.

25. The process according to claim 24, wherein step (a) is carried out at a temperature of 20° C. to 150° C.

26. The process according to claim 24, wherein step (a) is carried out, for 5 min to 60 min.

27. The process according to claim 24, wherein said vulcanized rubber in a subdivided form is heated at a temperature of 20° C. to 150° C., before the addition of the oxidizing agent.

28. The process according to claim 24, wherein said oxidizing agent is mixed with a solvent selected from organic solvents and mixtures thereof.

29. The process according to claim 28, wherein said organic solvent is selected from ketones, alcohols, ethers, or mixtures thereof.

30. The process according to claim 24, wherein said oxidizing agent is mixed with a solvent selected from water, and mixtures thereof with water soluble organic solvents.

31. The process according to claim 30, wherein said solvent further comprises a surface active agent.

32. The process according to claim 31, wherein said surface active agent is selected from non-ionic or ionic surfactants.

33. The process according to claim 24, wherein step (b) is carried out at a temperature of 0° C. to 250° C.

34. The process according to claim 24, wherein step (b) is carried out for 1 min to 30 min.

35. The process according to claim 24, wherein step (b) comprises the steps of
    (b1) mixing the surface treated vulcanized rubber in a subdivided form obtained in step (a) with at least one diene elastomeric polymer, and
    (b2) mixing the elastomeric composition obtained in step (b1) with at least one sulfur-based vulcanizing agent.

36. The process according to claim 35, wherein step (b1) is carried out at a temperature of 0° C. to 250° C.

37. The process according to claim 35, wherein step (b1) is carried out for 1 min to 30 min.

38. The process according to claim 35, wherein step (b2) is carried out at a temperature of 0° C. to 120° C.

39. The process according to claim 35, wherein step (b2) is carried out for 1 min to 30 min.

40. The process according to claim 24, wherein said oxidizing agent is selected from inorganic or organic oxidizing agent.

41. The process according to any claim 25, wherein said vulcanized rubber in a subdivided form:
    is surface treated with 1% by weight to 50% by weight of at least one oxidizing agent with respect to the total weight of the vulcanized rubber in a subdivided form; or
    has a particle size not higher than 10 mm; or
    is present in an amount of 0.1 phr to 90 phr; or
    comprises at least one crosslinked diene elastomeric polymer or copolymer selected from: cis-1,4-polyisoprene, 3,4-polyisoprene, polybutadiene, halogenated or non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof; or
    comprises at least one crosslinked elastomeric polymer of one or more monoolefins with an olefinic comonomer or derivatives thereof.

42. The process according to claim 24, wherein said diene elastomeric polymer:
    is selected from: cis-1,4-polyisoprene, 3,4-polyisoprene, polybutadiene, halogenated or non-halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof; or comprises at least one elastomeric polymer of one or more monoolefins with an olefinic comonomer or derivatives thereof.

43. The process according to claim 24, wherein the sulfur-based vulcanizing agent is selected from:
soluble sulfur, crystalline sulfur;
insoluble sulfur, polymeric sulfur;
sulfur dispersed in oil; and
sulfur donors, tetramethylthiuram disulfide, tetrabenzylthiuram disulfide, tetraethylthiuram disulfide, tetrabutylthiuram disulfide, dimethyldiphenylthiuram disulfide, pentamethylenethiuram tetrasulfide, pentamethylenethiuram hexasulfide, morpholinobenzothiazole disulfide, N-oxydiethylenedithiocarbamyl-N'-oxydiethylene-sulphenamide, dithiodimorpholine; caprolactam disulfide.

44. The process according to claim 24, wherein at least one reinforcing filler is present in the crosslinkable elastomeric composition in an amount of 0.1 phr to 120 phr.

* * * * *